Oct. 18, 1927.

H. A. TUTTLE 1,646,126

REVERSING GEARING

Filed March 15, 1923

Inventor,
Henry A. Tuttle
by
Greenwood
atty

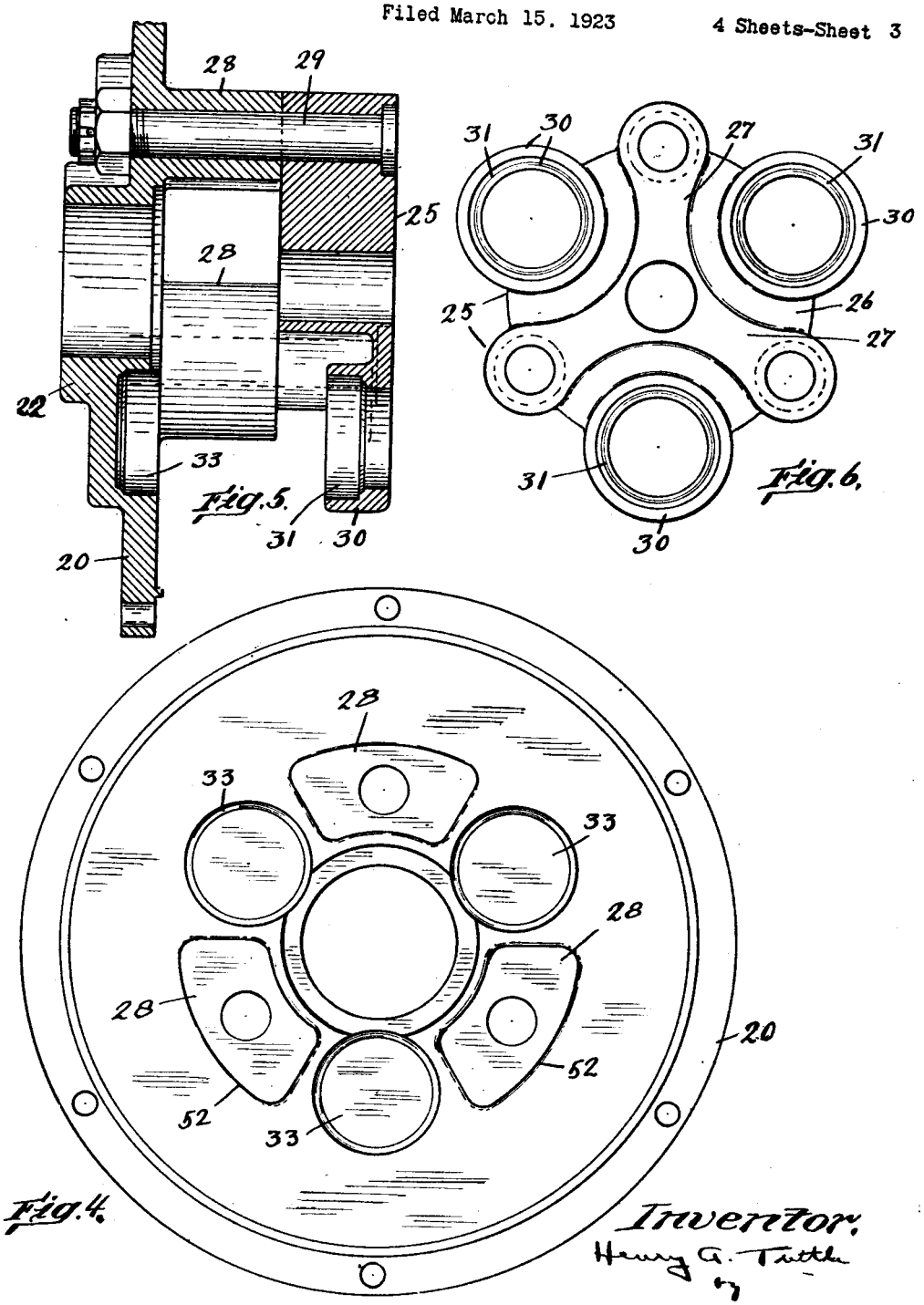

Oct. 18, 1927.

H. A. TUTTLE 1,646,126

REVERSING GEARING

Filed March 15, 1923      4 Sheets-Sheet 4

Inventor,
Henry A. Tuttle
by
atty

Patented Oct. 18, 1927.

1,646,126

UNITED STATES PATENT OFFICE.

HENRY A. TUTTLE, OF UPTON, MASSACHUSETTS.

REVERSING GEARING.

Application filed March 15, 1923. Serial No. 625,339.

This invention relates to reversing gearing of the type comprising a driving shaft, a driven shaft, gearing including intermeshing pinions and gears and brake mechanisms to connect said shafts for reverse drive, and clutch mechanism including sets of clutch plates to connect said shafts for forward drive. The invention is particularly related to and has for an object to provide a reversing gearing adapted to give a relatively high speed in reverse drive.

The gearing and clutch mechanism are or may be disposed side by side in an enclosing casing, which latter may comprise an element of the gearing mechanism. A reversing gearing arranged to provide a relatively high reverse speed may include gears fixed to said shafts, and fixedly connected pinion gears of different diameters arranged in axial alignment to connect said shaft gears. The reverse gearing thus arranged may necessitate a relatively long axial extent, and a relatively long enclosing casing, and it is a further object of this invention to provide a reversing gearing of the above type having a decreased axial extent.

It is a further object of the invention to dispose the clutch mechanism in that portion of the enclosing casing containing the gearing mechanism, and peripherally about said gearing, whereby to decrease the axial length of the casing, and so arrange the clutch mechanism that it is connected with and preferably supported by gear elements of the gearing mechanism.

A further object of the invention is generally to improve the construction and operation of reversing gearing.

Certain features of this invention are disclosed but not claimed in my concurrently filed application Serial No. 625,390.

Fig. 4 is a side elevation of the inner face of an end plate of the reversing gearing.

Fig. 5 is a sectional elevation of the end plate of Fig. 4 with the carrier plate secured thereto.

Fig. 6 is an end elevation of the pinton carrier plate of Fig. 5.

Fig. 11 is a sectional detail illustrating a modified arrangement of connecting the link-supporting ring with the casing.

Figure 1:
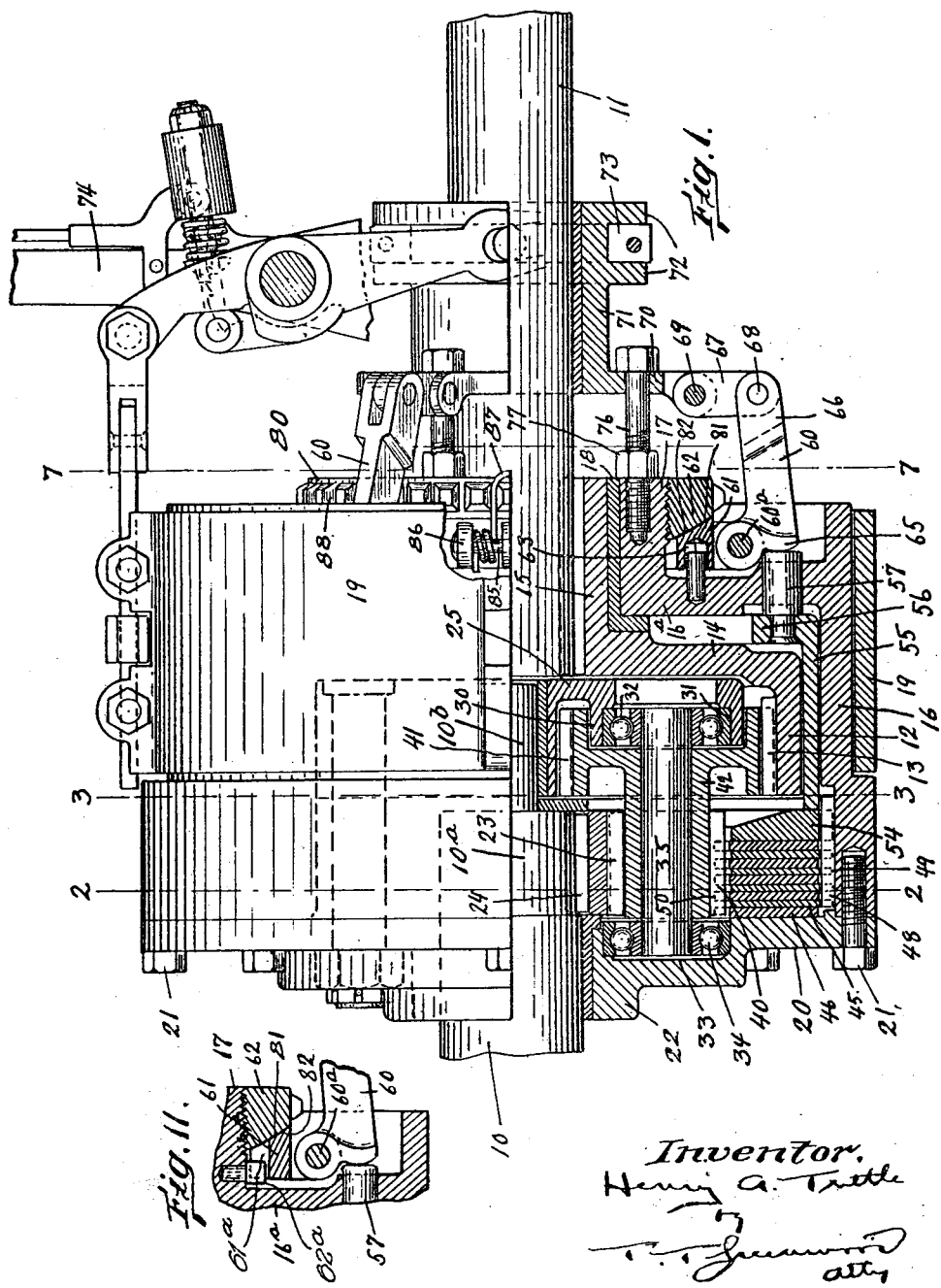
Fig. 1 is a side elevation, partly in section, of a reversing gearing embodying the invention.
Figure 2:
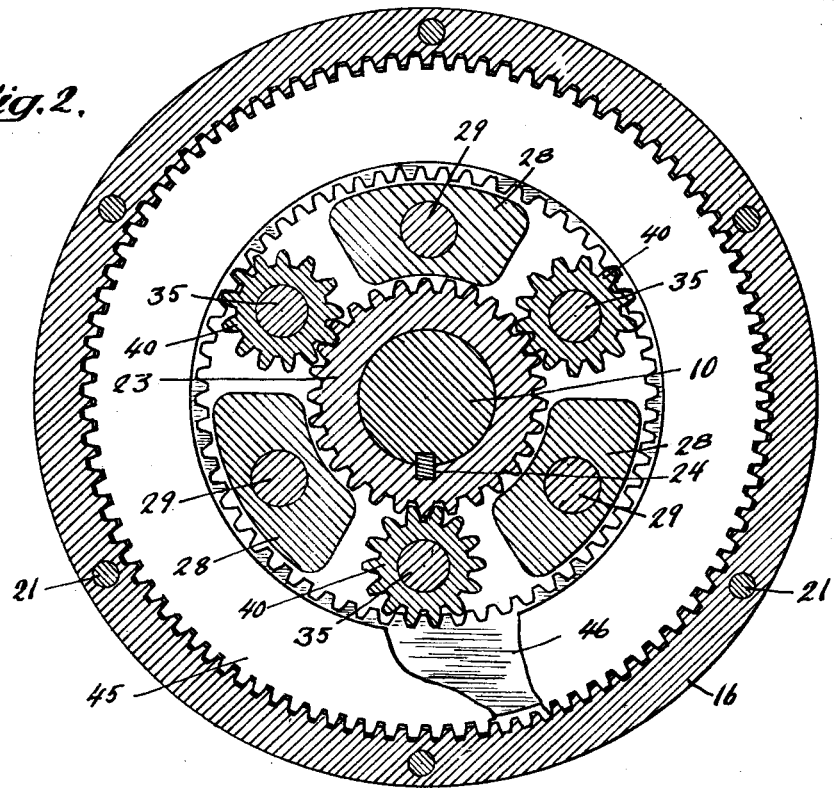
Fig. 2 is a section along line 2—2 of Fig. 1.
Figure 3:
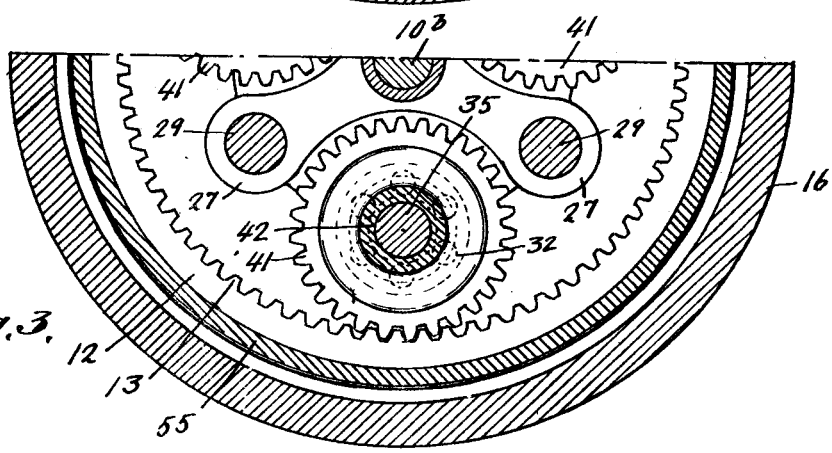
Fig. 3 is a partial view, in section, along line 3—3 of Fig. 1.
Figure 7:
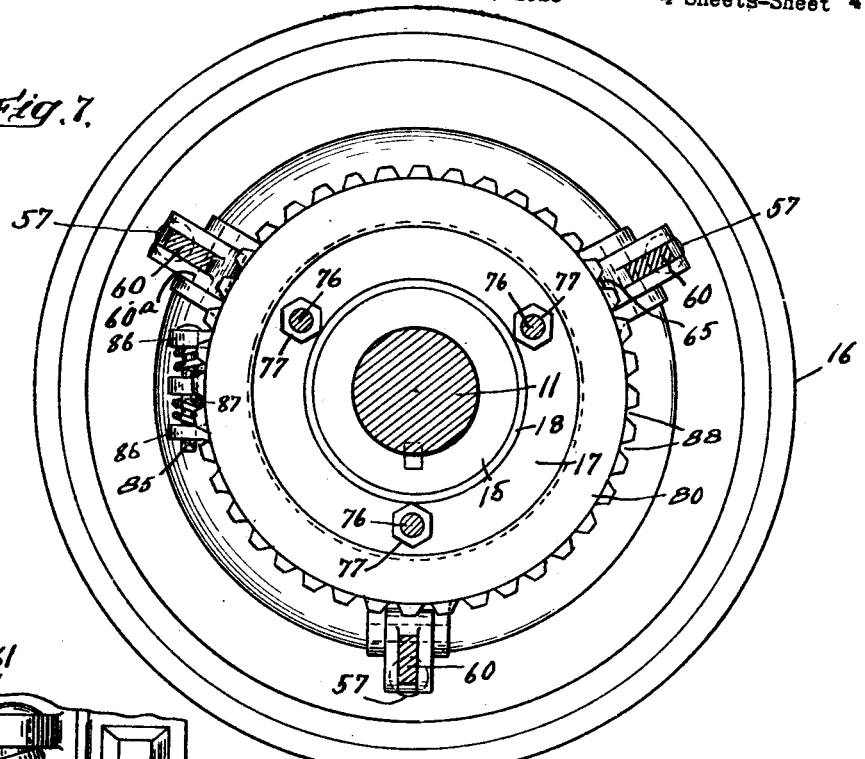
Fig. 7 is a sectional view along line 7—7 of Fig. 1.
Figure 8:
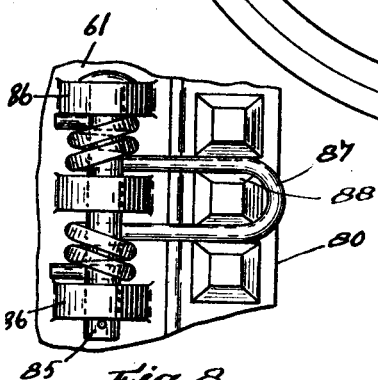
Fig. 8 is a plan detail of the locking means for the clutch pressure-adjusting ring.

As here shown, the reversing gearing embodying the invention comprises the driving shaft 10 and the driven shaft 11, both arranged in axial alignment. An internal gear is carried by one of said shafts, as the driven shaft 11, and said gear includes the drum 12 formed internally with the gear teeth 13. Said drum may have the wall 14 which bears the hub 15, and said driven shaft 11 is received in and fixed to said hub. A cylindrical casing 16 is arranged to enclose the internal gear and other components of the reversing gearing, and said casing may be formed or provided with an integral wall 16ª at one end thereof which has the hub 17, which latter is rotatably supported on a bearing 18 carried by the hub 15 of the internal gear. The casing is adapted to be restrained from rotation during reverse drive by suitable means as the brake band 19 which encircles and is arranged to be contracted into engagement with said casing. The casing also provides a bearing support for the driven shaft. The casing 16 is provided with a plate 20 at the other end thereof and, preferably, said plate is secured to the casing by suitable means, as bolts 21. Said end plate is formed with the hub 22 by which the casing is rotatably supported on the driving shaft 10.

The driving shaft 10 is or may be formed with the reduced portion 10ª on which a spur gear 23 is fixed, as by the key 24, and the end portion 10ᵇ of the shaft may be yet further reduced and form a bearing support for the carrier plate 25, which latter is arranged to form a support for the intermediate pinion gears of the reversing gearing.

The carrier plate 25, see Figs. 5 and 6, is or may be formed with the outstanding flange 26 which may have the radial and equally-spaced arms 27 integrally formed therewith.

The end plate 20 is or may be formed or provided with the lugs 28 outstanding from its inner face, and said arms 27 of the carrier plate are arranged to engage the ends of said lugs and be secured thereto by suitable means as the bolts 29 whereby the carrier plate, for the purpose, is integral with the end plate 20, and with the casing 16. Said carrier plate is supported rigidly away from the end plate to provide a space in which the spur gear 23 is received and intermediate pinion gears are adapted to enter the spaces between said lugs and mesh with said gear 23.

Said disc 26 of the carrier plate is formed with the bosses 30 which are disposed between said arms 27 and extend toward the end plate 20 and said bosses are formed with the internal recesses 31 in which suitable bearings, as the ball bearings 32, are received. The end plate 20 is also formed with recesses 33 which are aligned with said recesses 31 and anti-friction bearings, as ball bearings 34, are received in said recesses 33. Pins 35 are extended between and rotatably supported in said bearings and are adapted to carry the intermediate pinion gears.

The intermediate pinion gears comprise sets each having a small pinion gear 40 which is adapted to mesh with the spur gear 23 carried by the driving shaft 10, and a large pinion gear 41 which is adapted to mesh with the internal gear 13. Said pinion gears are arranged side by side on a pin 35 and may be integrally formed and connected by the hub 42, and said hub, preferably, is fixed to and rotatable with said pin 35. This arrangement provides for a greater speed of the driven shaft 11 in reverse drive than can be provided by a single pinion gear connecting the pinion and internal gears carried by said shafts.

With the above arrangement, it will be seen that when the brake 19 is applied to hold the casing 16 against rotation, the intermediate gears 42 and 41 will be rotated by the driving shaft 10 to drive the driven shaft 11 in the reverse direction, and the relative speed of the driven shaft compared with the driving shaft depends upon the proportions of the gearings connecting said shafts. During forward drive, the brake 19 is adapted to be free of the casing 16 whereby to permit it to rotate freely.

In accordance with my invention, I dispose the clutch mechanism, by which forward drive is secured, in that portion of the casing containing the reversing gearing, and particularly in that portion of the casing about the intermediate pinion gears 40, and peripherally about said gears 40.

The clutch mechanism comprises a set of clutch plates 45 adapted to be carried by the casing 16 and a second and intermeshing set of clutch plates 46 adapted to be carried by the intermediate pinion gears 42. The casing 16 is provided with a plurality of axially arranged teeth 48 having, preferably, internal gear tooth formation and said clutch plates 45 are provided with intermeshing teeth 49 having, preferably, external or spur gear tooth formation. Said external gear teeth 49 are cut to a slightly less pitch diameter than said internal gear teeth 48 whereby to permit said clutch plate to slide axially along and in driving contact with said internal gear teeth. This arrangement provides means by which said clutch plates are carried by and connected for axial movement on but against rotary motion independent of said casing.

Said clutch plates 46 are formed with teeth 50 in the inner periphery thereof which have internal gear tooth formation and said teeth are adapted to mesh with and be free for axial movement on the teeth of said intermediate pinion gears 42. The lugs 28 of said end plate 20 are or may be formed with arcuate faces 52 closely conforming with but preferably of slightly less than the internal diameter of said clutch plates 46. Said lugs may serve to center and support said clutch plates 46 against abnormal displacement from a position concentric with the axes of the driving and driven shafts in the event of wear between said plates and the pinion gears 40 although, ordinarily, said pinion gears serve as the supporting means for said plates.

A pressure plate 54 may be disposed within the casing to bear against the sets of clutch plates and force them into frictional engagement, whereby to set the reversing gearing for forward drive, and said pressure plate may comprise one of the set of and be constructed similarly to the clutch plates 45.

When the clutch plates are pressed into clutching engagement it will be seen that the pinion gears 40 are locked to the end plate 20, and thereby to the casing against rotation and that, consequently, the driving and driven shafts are locked together through the casing and the pinion gears 41 and the internal gear 13 and the driven shaft may rotate conjointly with the driving shaft. When the pressure on the clutch plates is released and the gearing is in neutral, the plates will or may separate and, as there is no positive connection between the driving and driven shafts, the driving shaft is free to rotate and the driven shaft may remain without rotation. In the neutral condition of the reversing gearing, the casing may be rotated by the driving shaft, due to the driving connection between the driving shaft and the intermediate pinions and the clutch plates 46 may be rotated by the pinion gears 40 whereby, during succeeding clutching operations, different gear teeth on said clutch plates will be presented to receive the driving torque.

The clutch mechanism includes clutch actuating mechanism including a ring 55 which is disposed within the casing 16 about the drum 12 of the internal gear and is slidably supported by said casing and is movable axially to engage the clutch pressure plate 54 and set the clutch. Said ring 55 may also serve as a support for the drum 12 of said internal gear whereby to support it rotatably. Said ring 55 is or may be formed with an inwardly-directed flange 56 which is disposed between the flange 14 of the internal gear and the end wall 16ᵃ of the casing. Pins 57 may be fixed in said flange 56 and slidably extended axially through apertures in and outwardly beyond the end wall 16ᵃ of said casing. Said pins form means by which the ring 55 is fixed to the casing for rotation therewith. Said pins are adapted to be engaged by levers 60 which are pivoted on pins 60ᵃ carried by a ring 61 and said ring is or may be carried by the casing for axial movement but against rotation independently thereof by suitable means as the pins 62 carried by the end wall 16ᵃ of the casing and loosely fitting slidably in enlarged recesses 63 in said ring. Said levers 60 are or may be formed with the cam portions 65 which are adapted to bear against the ends of said pins 57, and the bifurcated end portions 66. Links 67 are received between the furcations of said levers and pivoted on the pins 68. The inner ends of said links are or may be pivoted on the pins 69 carried by the outstanding flange 70 of a thrust sleeve 71. Said thrust sleeve is or may be slidably mounted on the driven shaft and is or may be formed with the two annular and outstanding flanges 72 between which a collar 73 is loosely received. A pivoted operating handle 74 is or may be connected with said collar and forms means by which the clutch mechanism is set for forward drive. It is obvious that when said thrust sleeve 71 is moved axially to the right, Fig. 1, the levers 60 will be forced outwardly to move the ring 55 axially and cause the engagement of the clutch plates and, when said thrust sleeve is moved to the left, the clutch plates will become disengaged. Suitable brake operating mechanism, not here shown, is or may be also connected with said handle 74 and the brake band 19 and so arranged that a movement of said handle to an extreme position to the left sets the brake and conditions the gearing for reverse drive. The levers 60 are adapted to be free from positive connection with the pins 57 of the ring 55 whereby to permit free movement of the thrust sleeve 71 for reverse drive. It is to be noted that said links 67 and flange 70 of the thrust ring cooperate to form toggle members which hold the levers 60 in clutch set position.

Means are or may be provided to restrict the movement of the thrust sleeve 71 beyond clutch-set position, and said means may comprise bolts 76 which are adjustably threaded in the hub 18 of the casing and extended axially and slidably in apertures in the flange 70 of said thrust sleeve. The heads of said bolts are adapted to engage the flange 70 and restrict movement of the thrust sleeve beyond clutch-set position. Said bolts 76 may be secured in adjusted position by the check nuts 77. Said bolts also form means by which the thrust sleeve is driven by the casing.

Means are or may be provided whereby to adjust the clutching pressure and compensate for wear between the clutch plates and in the clutch operating mechanism. Said means may comprise a pressure-adjusting ring 80 which is internally screw-threaded and threaded adjustably on the exteriorly screw-threaded hub 18 of the gearing casing. Said ring is or may be formed with the spherically-shaped inner face 81 which is adapted to engage the correspondingly shaped face 82 of the ring 61. Said ring 80 is adapted to receive the thrust of said ring 61 as the clutch is set. It is seen that the clutching pressure is increased as said ring 80 is screwed further on to the hub 18.

With the construction above set forth no especial adjustment need be contained in the link and lever mechanism including the levers 60 and links 67, to obtain a balanced thrust at each lever 60 on the clutch plates, as the balancing of the clutching pressure is obtained automatically by the provision of the cooperating spherically-shaped engaging surfaces 81 of said rings 61 and 80. It is apparent that, if one of said levers 60 is so adjusted that it exerts a greater thrust on its pin 57 than the other corresponding levers, the ring 61 will be moved laterally on its seat on the ring 80 by the unbalanced thrust, whereby to decrease the leverage of the other links 60 on their corresponding pins 57, and thereby balance the thrust. The pin-recesses 63 in said ring 11 are made somewhat larger than the guide pins 62 to permit such movement of the ring.

In Fig. 11 is illustrated a modified form of driving connection, for said ring 61 wherein the ring is formed with one or more internal and axial grooves 61ᵃ in which one or more pins 62ᵃ are loosely received; and said pins may be outwardly extended from and fixed in said hub 17. Said grooves 61ᵃ are substantially deeper than the height of said pins 62ᵃ whereby to permit the lateral movement of said ring 61.

Means may be provided to lock said ring 80 releasingly in adjusted position on the casing. Said means may include the pin 85 which is carried by lugs 86 which are or may be integral with and extend outwardly from the periphery of the ring 61. A wire loop 87 may have its ends coiled about said pin 85 and bear yieldingly against said ring 61. Said adjusting ring 80 may have a series of notches 88 formed in its periphery and said loop 87 may be arranged to be received yieldingly in two adjacent notches, whereby to hold said ring 80 in adjusted position to said ring 61. Said loop 87 is adapted to yield and be raised free from said notches whereby to permit the ring 80 to be rotated and when released will move inward by its spring action and again engage the notches of said ring.

Figure 10:
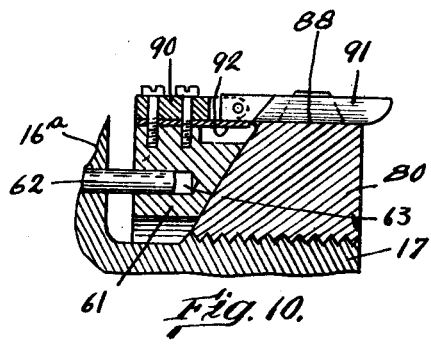
Figs. 9 and 10 are plan and sectional details, respectively, of modified locking means for the clutch pressure-adjusting ring.
Figure 9:
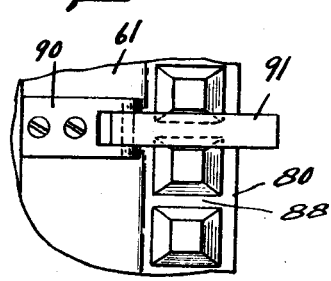

Figs. 9 and 10 illustrate a modified form of locking means for said ring 80. Said means includes a bar 90 which is secured to said thrust ring 61 and has a latch member 91 pivoted thereto and extended over and in a position to enter the notches of said ring 80. A spring 92 is arranged to hold said latch-member 91 yieldingly in said notches and yield to permit said latch-member to be raised to release said ring for rotation; and said spring is or may be arranged to hold said latch-member in raised position until it is manually depressed. In both modifications, the spring 92, or the resilient loop 87 is preferably adapted to yield while retaining locking engagement with said ring 80, whereby to permit said ring 61 to move laterally to balance the clutching pressure, and yet maintain said adjusting ring 80 locked in adjusted position.

The construction herein shown may be modified without departing from the spirit of the invention. For instance, the clutch mechanism is here shown in connection with an internal gear type of reversing gearing. It may be equally applicable to a reversing gearing of the spur gear type.

I claim:

1. Reversing gearing comprising the combination of a driving shaft, a driven shaft and gearing adapted to connect said shaft for reverse drive, said gearing including a spur gear carried by said driving shaft, an internal gear carried by said driven shaft, a pinion carrier comprising plates disposed on opposite sides of said spur gear and rotatably supported on said driving shaft, angularly-spaced means disposed about and beyond said spur gear uniting said plates in spaced relation, said plates having aligned recesses therein, anti-friction bearings received in said recesses, pins extended between said plates and rotatable in said bearings, and pinion gears carried by said pins and connecting said spur and internal gears.

2. Reversing gearing comprising the combination of a driving shaft, a driven shaft and gearing adapted to connect said shafts for reverse drive, said gearing including a spur gear carried by said driving shaft, an internal gear carried by said driven shaft, a pinion carrier comprising plates disposed on opposite sides of said spur gear and rotatably supported on said driving shaft, means uniting said plates in spaced relation comprising lugs extended from a face of one of said plates arranged in engagement with said other plate, and bolts passed through said plates and lugs, said plates having aligned recesses therein, anti-friction bearings received in said recesses, pins extended between said plates and supported in said bearings, and pinion gears carried by said pins and connecting said spur and internal gears.

3. Reversing gearing comprising the combination of a driving shaft, a driven shaft and gearing adapted to connect said shafts for reverse drive, said gearing including a spur-gear carried by said driving shaft, an internal gear carried by said driven shaft, a pinion carrier comprising plates disposed on opposite sides of said spur gear and rotatably supported on said driving shaft, means uniting said plates in spaced relation, a pin extended between and rotatable in said spaced plates, and small and large connected pinion gears rotatably carried by said pin and connected respectively with said spur and internal gears.

4. Gearing mechanism comprising the combination of a driving member, a driven member, gearing including planetary gearing elements connecting said members, and clutch mechanism for connecting said members including a clutch plate having gear teeth meshing with the gear teeth of and driven by said planetary gearing elements, and a cooperating clutch plate associated with one of said members.

5. Reversing gearing comprising the combination of a driving shaft, a driven shaft, clutch mechanism including coacting clutch plates adapted to connect said shafts for forward drive, and planetary gearing elements disposed within and in rotatable engagement with said clutch plates adapted to connect said shafts for reverse drive, said clutch plates having internal gear teeth meshing with and supported by the teeth of said gearing elements.

6. Reversing gearing comprising the combination of a driving shaft, a driven shaft, gearing adapted to connect said shafts for reverse drive comprising gears carried by said shafts, pinion gears meshing with said shaft gears, and clutch mechanism adapted to connect said shafts for forward drive including clutch plates disposed about and having gear teeth meshing with the gear teeth of said pinion gears.

7. Reversing gearing comprising the combination of a driving shaft, a driven shaft, gearing adapted to connect said shafts for reverse drive comprising gears carried by said shafts, small and large pinion gears meshing with said shaft gears, and clutch mechanism adapted to connect said shafts for forward drive including clutch plates disposed about and having gear teeth meshing with the gear teeth of said small pinion gears.

8. Reversing gearing comprising the combination of a driving shaft, a driven shaft, gearing adapted to connect said shafts for reverse drive including gears carried by said shafts, a pinion gear carrier, pinion gears carried by said carrier and meshing with the gears of said driving and driven shafts, and clutch mechanism adapted to connect said shafts for forward drive including a clutch member carried by and having internal gear teeth meshing with the gear teeth of said pinion gears, a second clutch member carried by said carrier, and means to operate said clutch members to lock together said pinion gears and carrier.

9. Reversing gearing comprising the combination of a driving shaft, a driven shaft, planetary gearing adapted to connect said shafts for reverse drive including a carrier, gears carried by said carrier and arranged for driving connection with said shafts, and clutch mechanism adapted to connect said shafts for forward drive including clutch plates carried by and fixed for rotation with said carrier, and co-acting clutch plates carried on and driven by the gear teeth of said carrier-gears.

10. Reversing gearing comprising the combination of a driving shaft, a driven shaft, gearing adapted to connect said shafts for reverse drive including a pinion gear carrier, pinion gears carried by said carrier and arranged for driving connection with said shafts, and clutch mechanism adapted to connect said shafts for forward drive comprising clutch plates having internal gear teeth meshing with the gear teeth of and supported by said pinion gears, and co-acting clutch plates driven by said carrier.

11. Reversing gearing comprising the combination of a driving shaft, a driven shaft, gearing adapted to connect said shafts for reverse drive including a casing, pinion gears rotatably supported by said casing arranged for driving connection with said shafts, and clutch mechanism adapted to connect said shafts for forward drive including clutch plates disposed about said pinion gears having internal gear teeth meshing with the gear teeth of said pinion gears and axially movable in engagement therewith, and co-acting clutch plates carried by said casing and axially movable in driving engagement therewith.

12. Reversing gearing comprising the combination of a driving shaft, a driven shaft, gearing adapted to connect said shafts for reverse drive including gears carried by said shafts, a casing, sets of pinion gears rotatably supported by said casing arranged in engagement with the gears of said driving and driven shafts, and clutch mechanism adapted to connect said shafts for forward drive comprising clutch plates disposed about said sets of pinion gears and having internal gear teeth meshing with and free to rotate in engagement with the gear teeth of said pinion gears, other clutch plates carried by and axially movable in said casing, said casing having projections disposed within said clutch plates adapted to support said clutch plates rotatably, and means to actuate said clutch mechanism.

13. Clutch mechanism for reversing gearing comprising a toothed driving member, a driven member, and co-acting clutch plates adapted to connect said members, one of said clutch plates having a plurality of driving-member engaging-members and arranged to present different engaging-members for engagement with the teeth of said driving member.

14. Clutch mechanism for reversing gearing comprising a toothed driving member, a driven member, and co-acting clutch plates connecting said members, at least one of said clutch plates having teeth meshing with the teeth of said driven member and characterized by being rotatable on said driving member.

15. In a clutch mechanism for reversing gearing, a driving member comprising a spur gear, a clutch plate having internal gear teeth meshing with the gear teeth of said spur gear and eccentrically disposed with relation to said gear, a driven member, a clutch plate having a driving connection therewith, and means to actuate said clutch mechanism to force said clutch plates into driving engagement, whereby to connect said driving and driven members.

16. In a clutch mechanism for reversing gearing, a driving member comprising a spur gear, a clutch plate having internal gear teeth meshing with the gear teeth of said spur gear and eccentrically disposed with relation to said gear, and adapted for rotation in engagement with said gear, a driven member, a clutch plate arranged in driving connection therewith, and means to actuate said clutch mechanism to effect the engagement of said clutch plates.

17. Reversing gearing comprising the combination of a driving shaft, a driven shaft, gearing adapted to connect said shafts for reverse drive including an internal gear carried by the driven shaft, clutch mechanism adapted to connect said shafts for forward drive including clutch plates disposed in front of said internal gear, and a ring enclosing said internal gear arranged for axial movement to engage and comprises said clutch plates and thereby actuate said clutch mechanism.

18. Reversing gearing comprising the combination of a driving shaft, a driven shaft, gearing adapted to connect said shafts for reverse drive including an enclosing casing, gears carried by said shafts, pinion gears carried by said casing arranged in engagement with the gears of said driving and driven shafts, sets of clutch plates carried by said casing and pinion gears, and clutch actuating mechanism including a ring encircling said gearing and carried by and axially movable in said casing arranged to engage said clutch plates.

19. Reversing gearing comprising the combination of a driving shaft, a driven shaft, gearing adapted to connect said shafts for reverse drive including a spur gear carried by said driving shaft, an internal gear carried by said driven shaft, an enclosing casing, pinion gears carried by said casing arranged in engagement with said spur and internal gears, clutch mechanism adapted to connect said shafts for forward drive including sets of clutch plates carried by said casing and pinion gears, and clutch actuating mechanism including a ring carried by said casing and axially movable therein and enclosing said internal gear, and means to move said ring axially to effect the engagement of said clutch plates.

20. Reversing gearing comprising the combination of a driving shaft, a driven shaft, gearing adapted to connect said shafts for reverse drive including a spur gear carried by said driving shaft, an internal gear carried by said driven shaft, an enclosing casing having end walls, pinion gears carried by said casing arranged in engagement with said spur and internal gears, clutch mechanism adapted to connect said shafts for forward drive including sets of clutch plates carried by an end wall of said casing and said pinion gears, and clutch actuating mechanism including a ring carried by said casing and enclosing said internal gear having projections slidably received in and extended through the other end wall of said casing and means to engage the extended ends of said pins and move said ring axially, whereby to effect the engagement of said clutch plates.

21. Reversing gearing comprising the combination of a driving shaft, a driven shaft, gearing adapted to connect said shafts for reverse drive including an enclosing casing, clutch mechanism adapted to connect said shafts for forward drive including an axially movable member contained within said casing, and clutch actuating mechanism including a thrust ring axially adjustable on but restrained from rotation independent of said casing, levers pivotally carried by said thrust ring arranged to engage said movable member and operate it to actuate the clutch mechanism, and a pressure-adjusting ring for said thrust ring having adjustable screw-threaded connection with said casing.

22. Reversing gearing comprising the combination of a driving shaft, a driven shaft, gearing adapted to connect said shafts for reverse drive including an enclosing casing, clutch mechanism adapted to connect said shafts for forward drive including an axially movable member contained within said casing, and clutch actuating mechanism including a thrust ring axially adjustable on but restrained from rotation independent of said casing, levers pivotally carried by said thrust ring arranged to engage said axially movable member and operate it to actuate the clutch mechanism, and a pressure adjusting ring for said thrust ring having adjustable screw-threaded connection with said casing and means carried by said thrust ring arranged to lock said pressure adjusting ring in adjusted position.

23. Reversing gearing comprising the combination of a driving shaft, a driven shaft, gearing adapted to connect said shafts for reverse drive including an enclosing casing, clutch mechanism adapted to connect said shafts for forward drive including an axially movable member contained within said casing, and clutch actuating mechanism including a thrust ring axially adjustable on but restrained from rotation independent of said casing, levers pivotally carried by said thrust ring arranged to engage said axially movable member and operate it to actuate the clutch mechanism, and a pressure-adjusting ring for said thrust ring having adjustable screw-threaded connection with said casing and means carried by said thrust ring arranged to lock said pressure-adjusting ring in adjusted position comprising a latch pivotally supported by said thrust ring adapted to enter recesses in said pressure-adjusting ring.

24. Reversing gearing comprising the combination of a driving shaft, a driven shaft, gearing adapted to connect said shafts for reverse drive, clutch mechanism adapted to connect said shafts for forward drive, and clutch actuating mechanism including an axially adjustable thrust ring, a rotatable pressure-adjusting ring engageable with said thrust ring, and means to lock said pressure-adjusting ring in adjusted position comprising a relatively fixed latch adapted to enter recesses in said pressure-adjusting ring and hold it in adjusted position.

25. Reversing gearing comprising the combination of a driving shaft, a driven shaft, gearing adapted to connect said shafts for reverse drive, clutch mechanism adapted to connect said shafts for forward drive, and clutch actuating mechanism including an axially adjustable thrust ring, a rotatable pressure-adjusting ring engageable with said thrust ring, and means to lock said pressure-adjusting ring in adjusted position comprising a relatively fixed spring latch carried by said thrust ring adapted to enter recesses in the periphery of said pressure-adjusting ring and hold it in adjusted position.

26. Reversing gearing comprising the combination of a driving shaft, a driven shaft, gearing adapted to connect said shafts for reverse drive including an enclosing casing, a spur gear carried by said driving shaft, an internal gear carried by said driven shaft, sets of connected small and large pinion gears rotatably supported by said casing and meshing with said spur and internal gears respectively, clutch plates disposed about said small pinion gears having internal gear teeth meshing with the teeth of said small pinion gears, co-acting clutch plates driven by and axially movable in engagement with said casing, and clutch actuating mechanism arranged to effect the engagement of said clutch plates.

27. Reversing gearing comprising the combination of a driving shaft, a driven shaft, gearing adapted to connect said shafts for reverse drive including an enclosing casing, a spur gear carried by said driving shaft, an internal gear carried by said driven shaft, sets of connected small and large pinion gears rotatably supported by said casing and meshing with said spur and internal gears respectively, clutch plates disposed about said small pinion gears having internal gear teeth meshing with the teeth of said small pinion gears, co-acting clutch plates driven by and axially movable in engagement with said casing, and clutch actuating mechanism arranged to effect the engagement of said clutch plates comprising a ring enclosing said internal gear and driven by said casing and arranged for axial movement therein, and means to move said ring axially, whereby to actuate the clutch mechanism.

28. Reversing gearing comprising the combination of a driving shaft, a driven shaft, gearing adapted to connect said shafts for reverse drive including a spur gear fixed to the driving shaft, an internal gear fixed to the driven shaft, a rotatable pinion gear carrier, and pinion gears rotatably supported by said carrier and arranged for driving engagement with said spur and internal gears, and clutch mechanism adapted to connect said shafts for forward drive comprising clutch plates carried by said pinion gears and having internal gear teeth meshing with the gear teeth of said gears, and co-acting clutch plates carried by said pinion gear carrier.

In testimony whereof, I have signed my name to this specification.

HENRY A. TUTTLE.